June 30, 1953   C. DOERING ET AL   2,643,495
APPARATUS FOR CUTTING AND IMPRESSING SUBSTANCES
Filed May 13, 1948   6 Sheets-Sheet 4
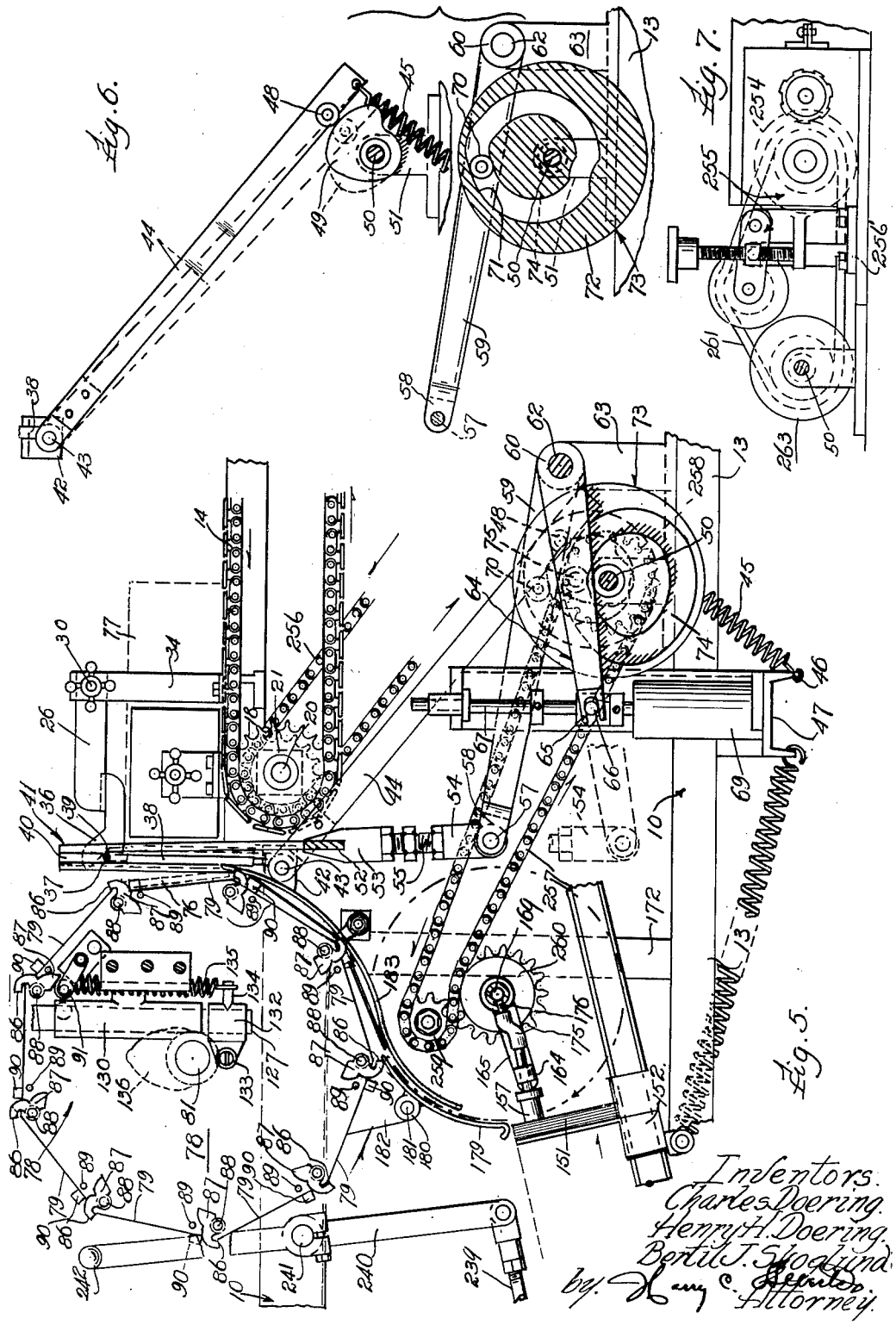

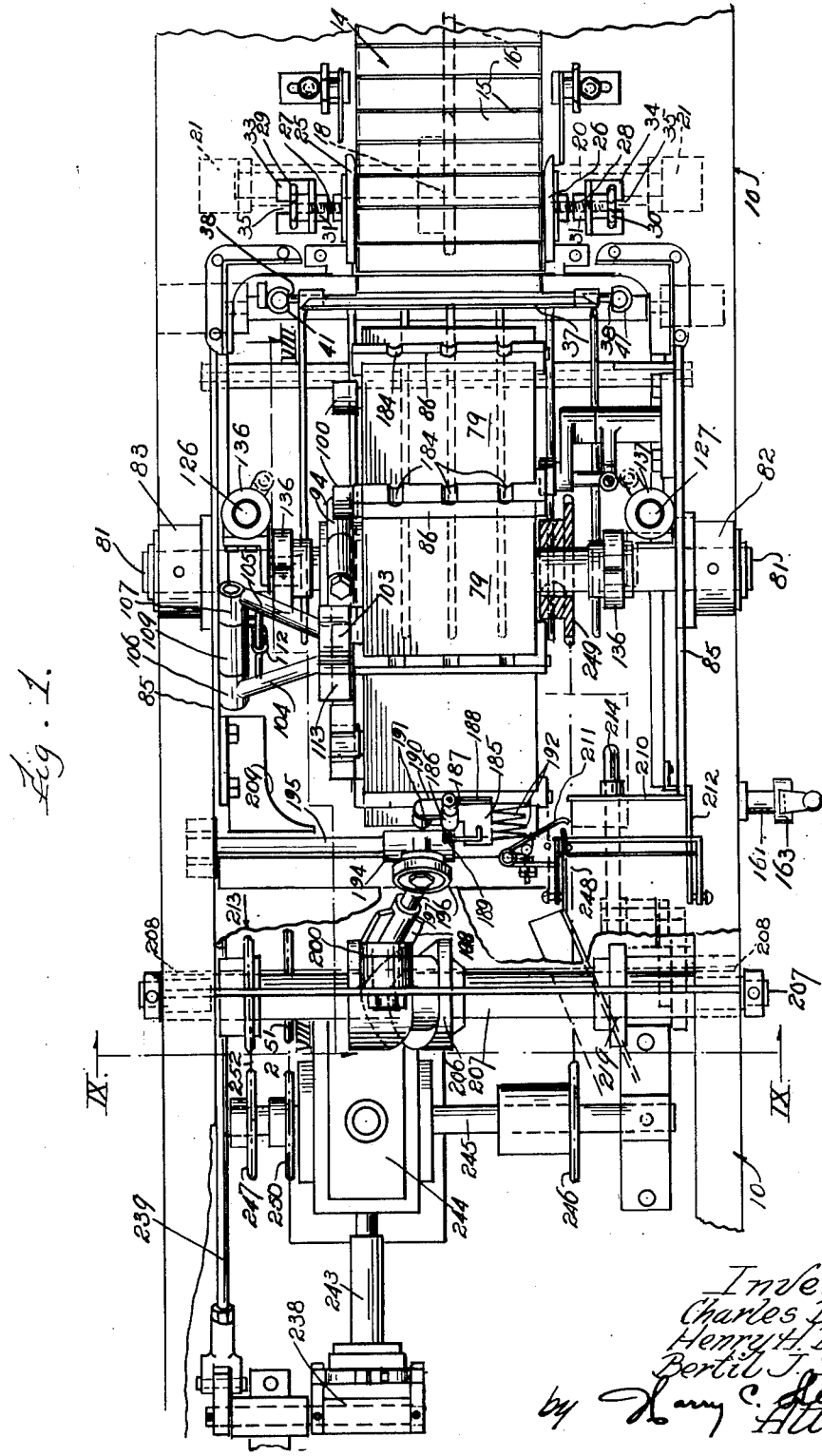

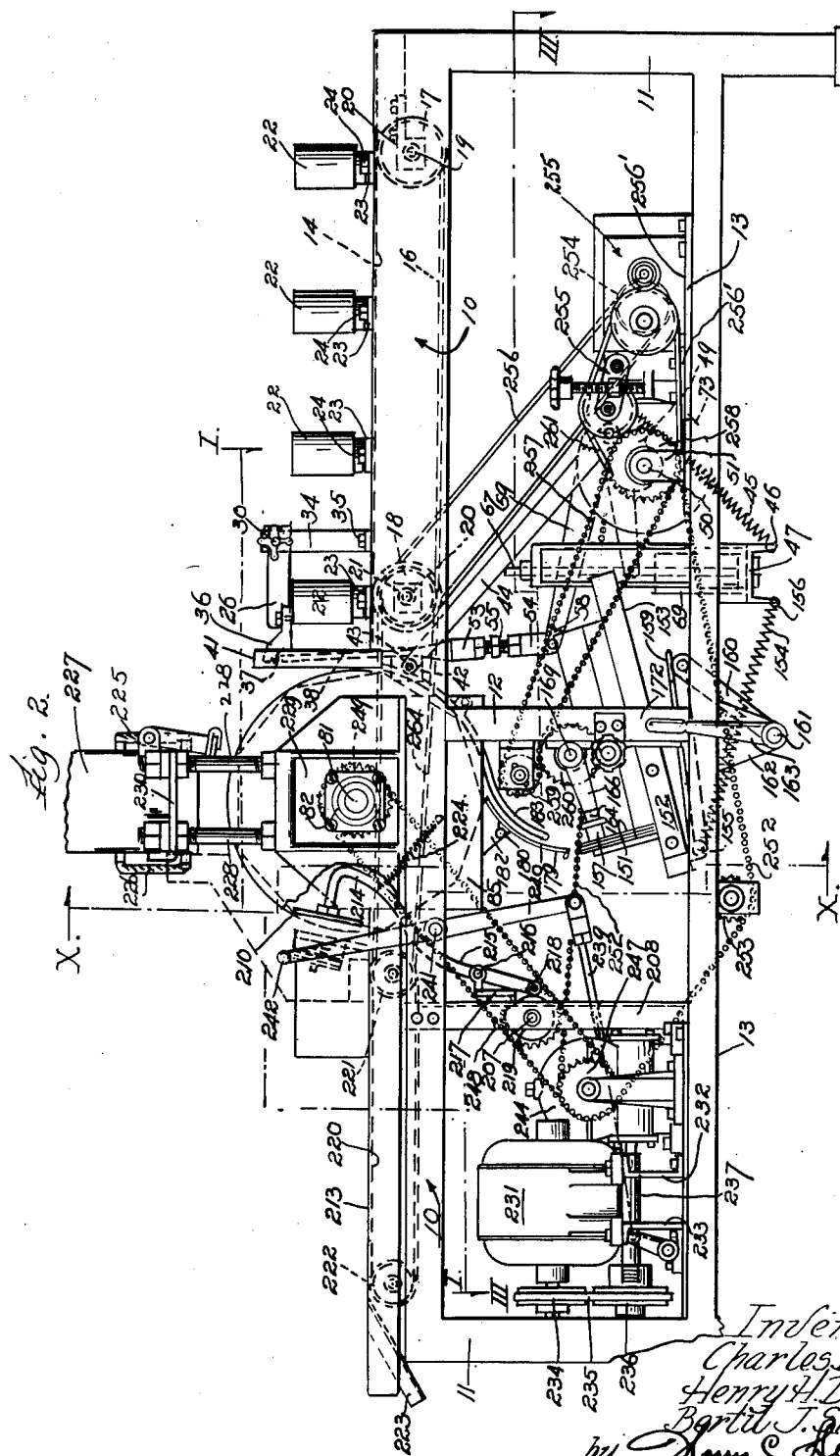

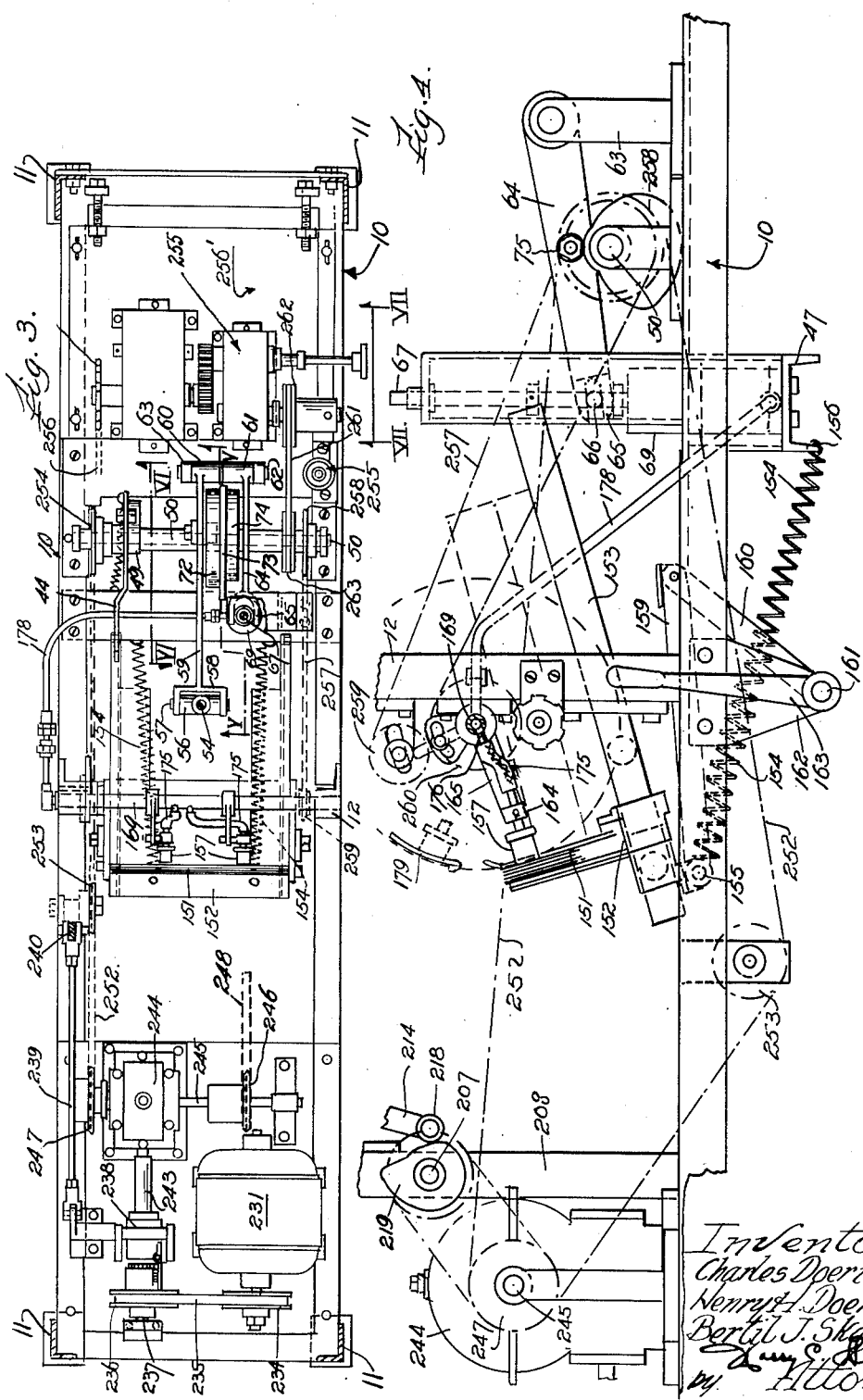

June 30, 1953 C. DOERING ET AL 2,643,495
APPARATUS FOR CUTTING AND IMPRESSING SUBSTANCES
Filed May 13, 1948 6 Sheets-Sheet 5

Inventors.
Charles Doering
Henry H. Doering
Bertil J. Skoglund
by Harry C. —
Attorney

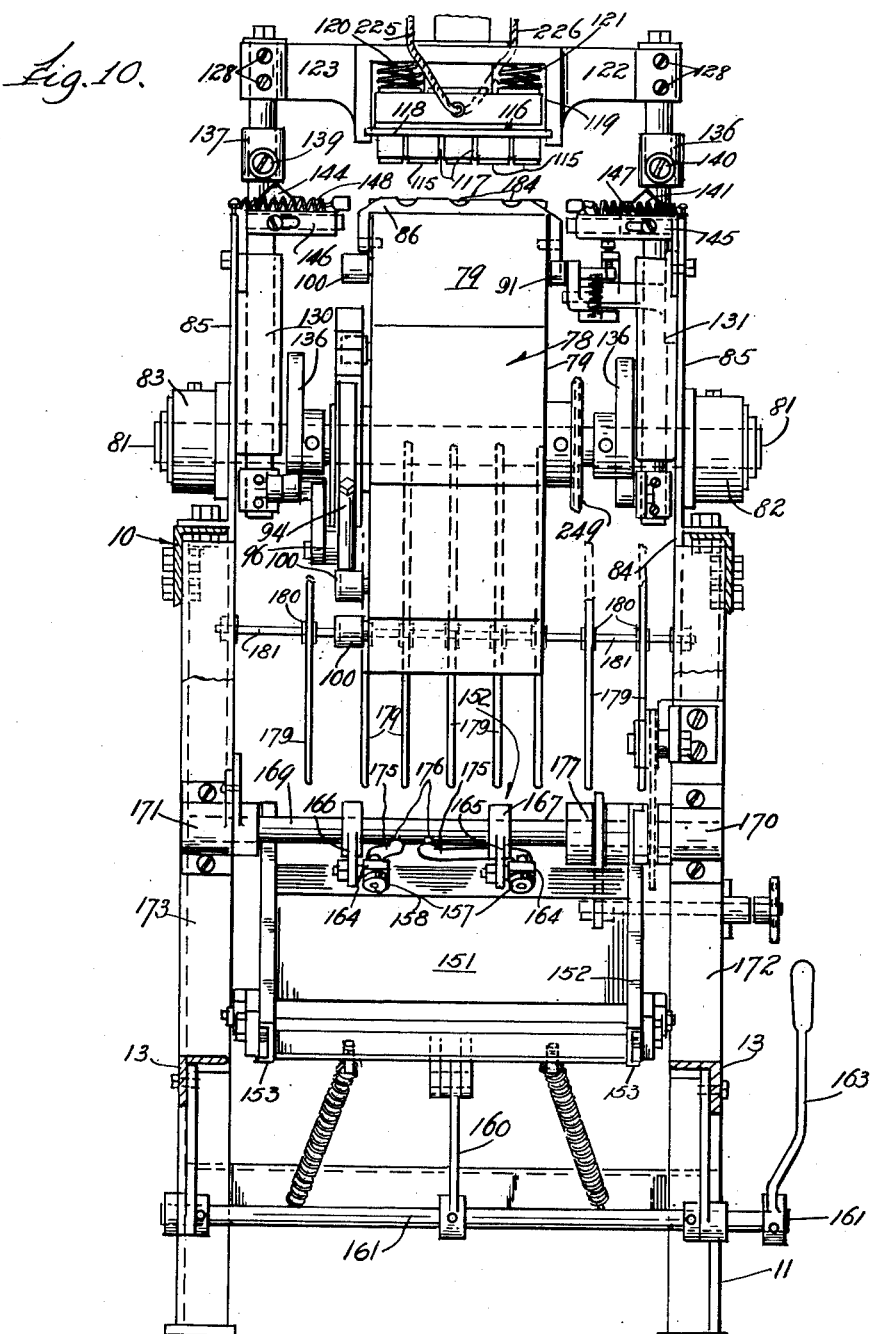

Patented June 30, 1953

2,643,495

UNITED STATES PATENT OFFICE 2,643,495

APPARATUS FOR CUTTING AND IMPRESSING SUBSTANCES

Charles Doering, Henry H. Doering, and Bertil J. Skoglund, Chicago, Ill.; said Skoglund assignor to said Charles Doering and Henry H. Doering Application May 13, 1948, Serial No. 26,906

19 Claims. (Cl. 53—55)

This invention relates to combined cutting and impressing devices for converting edible plastic slabs into segmented and impressed units of varied or any desired surface design, although certain features thereof may be employed with equal advantage for other purposes.

It contemplates more especially the provision of cutting and impressing instrumentalities combined to convert edible plastics into polygonal units in a single operation constituting automatically repeated continuous operations.

It has been customary to form edible plastics such as butter and kindred edible substances into rectangular bricks of varying weights; however, these necessitated transverse and longitudinal severance with auxiliary devices to create rectangular segments primarily for restaurant purposes. This not only entails much labor in the preparation thereof for serving to the consumer, but also the contour thereof is only utilitarian and does not enhance the appearance thereof, and is an important factor in pleasing the taste of the individual consumer.

The novel formation of edible plastics into adhering units of varied design imparts a continuous polygonal effect, serves to impart a more pleasant appearance thereto, and also eliminates considerable labor heretofore necessary in producing palatable segments thereof. Edible plastics produced in accordance with the teachings of the present invention require a single operating stroke severance and surface design formation, this being distinguished from the usual method of longitudinal and then transverse division of bricks into multiple segments of usual rectangular shape without any possible surface design that is not altogether advantageous for restaurant purposes.

Power operation of conveying means serves to feed slabs of substance in the path of the impressing and cutting instrumentalities to render the latter effective to convert the slabs into design impressed multiple segments or units of operation without manual intervention. This may be in the form of suitable automatic controls depending upon the dictates of commercial practice. It is important that the power instrumentalities that actuate the cutting and impressing instrumentalities, be controlled to the extent of creating a single actuation for each slab of material that is presented thereto. This is controlled automatically to avoid a duplication of impressions and to insure precision as well as a maximum production by the improved combination of elements that makes possible the simultaneous power actuation of impressing, cutting and synchronized feeding instrumentalities in devices of this character.

One object of the present invention is to simplify the construction and improve the operation of services of the character mentioned.

Another object is to provide a simple, effective, and continuous operating machine to effect the formation of edible plastic slabs into a plurality of multiple segments of any selected surface design to render such more palatable and attractive.

Still another object is to provide an improved combination of elements that automatically feeds, impresses, and severs plastic slabs into a plurality of segmented units to the desired shape and appearance.

A further object is to provide an improved combination of feeding, segmenting, surface impressing, and discharging instrumentalities automatically operative in synchronized timed relation for the conversion of edible plastic slabs into multiple segments impressed with selected surface designs thereof.

A still further object is to provide a novel combination of feeding, impressing, cutting, wrapping and discharging instrumentalities in a continuously operating automatic machine.

Still a further object is to provide a novel combination of feeding, impressing, cutting, and ejecting instrumentalities in combination with thermal control means to continuously convert edible plastic slabs into multiple segments without human intervention.

Other objects and advantages will appear from the following description of an illustrative embodiment of the present invention.

In the drawings:

Figure 1 is a fragmentary plan view of a device embodying features of the present invention, parts thereof being broken away to clarify the showing.

Figure 2 is a fragmentary side view in elevation of the machine shown in Figure 1.

Figure 3 is a plan sectional view taken substantially along line III—III of Figure 2.

Figure 4 is a diagrammatic side view in elevation of the suction pick-up and paper feed instrumentalities shown in assembled relation in Figure 2.

Figure 5 is an enlarged fragmentary side view in elevation of the substance slab cutting and paper wrap feed mechanism shown in relation to the slab support and transfer drum.

Figure 6 are fragmentary sectional views of actuating instrumentalities for the cutter frame taken substantially along lines V—V and VI—VI of Figure 3, these being shown separately to clarify the illustration of the cutter frame reciprocating and oscillating mechanism.

Figure 7 is a fragmentary side view in elevation of the speed reducer viewed from line VII—VII of Figure 3.

Figure 10 is a fragmentary sectional view in elevation taken substantially along line X—X of Figure 2.

Figures 8, 9:
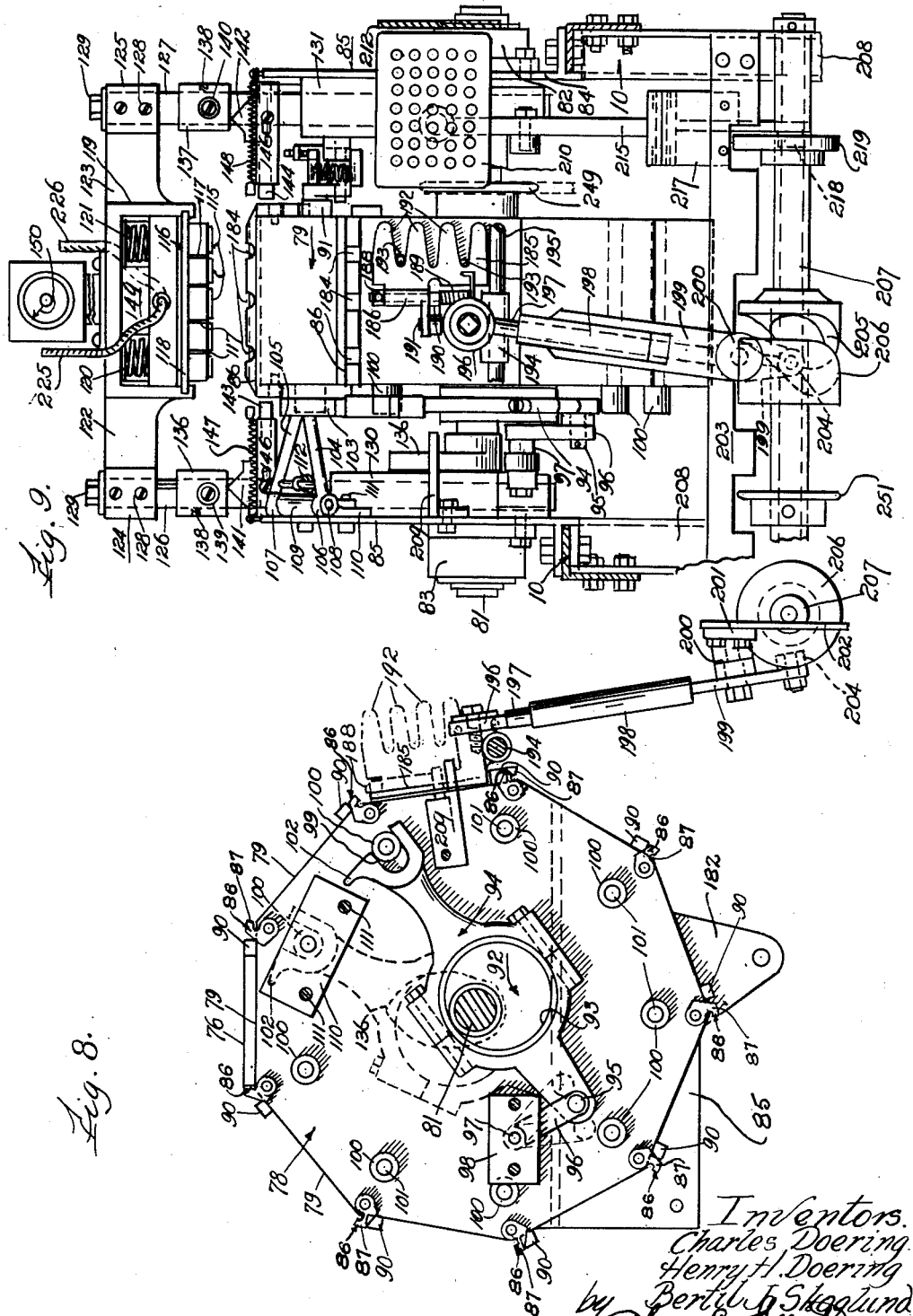
Figure 8 is a fragmentary sectional view in elevation taken substantially along line VIII—VIII of Figure 1.
Figure 9 is a fragmentary sectional view in elevation taken substantially along line IX—IX of Figure 1.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a horizontal frame member 10 of substantially rectangular figuration which is supported at the desired elevation by a plurality of corner standards 11, preferably though not essentially, comprising vertical angle irons attached at their upper ends to the frame member 10 by welding, riveting, or other suitable fastening expedients. Intermediate vertical braces 12 depend from the frame member 10 to horizontal braces 13 that extend between the corner standards 11 to reinforce the frame 10 against vibration and creeping as well as to serve as a support for some of the instrumentalities comprising parts of the machine which is illustrative of the invention and the teachings thereof.

The edible plastic substances that are contemplated for processing with the machine comprising the subject matter of this invention may take the form and characteristics of butter which is preferably extruded from a printing machine that is equipped with forming dies of the desired shape and size to present a cross section commensurate with the size of the slab to be impressed and cut into ornamental segments for serving in restaurants, public places, and private homes. The pre-formed horizontal column of butter or other suitable plastic substances are extruded from the printing machine to an endless conveyor belt 14 (Figures 1 and 2) consisting of narrow elongated rectangular metal plates 15 which are interconnected through the medium of an endless chain 16 which meshes with horizontally aligned sprockets 17—18 carried by shafts 19—20 journalled in bearing brackets 21. The bearing brackets 21 are mounted between the side members of the frame 10 to support the endless conveyor comprising the plates 14 that are continuously driven in a counter-clockwise direction (viewed from Figure 2).

In order to guide the pre-formed horizontal column of plastic substance along a pre-determined path on the frame 10, the latter is provided with a plurality of upstanding vertical guide rollers 22, in this instance four, equi-distantly linearly disposed rollers 22 on each side of the conveyor belt 14. The rollers 22 are journalled in brackets 23 (Figure 2) fixed to the top of the frame member 10 by means of bolts or other suitable fasteners 24 so as to guide the column of plastic substance to the discharge end of the conveyor belt 14 which is fitted with stationary horizontally extending plates 25—26 mounted on adjustable screws 27—28 terminating in the manual manipulating knobs or wheels 29—30. The screw members 27—28 are journalled in collars 31—32 disposed on each side of an upstanding bracket plate 33—34 which are fixed to the frame member 10 as at 35 (Figures 1 and 2). The horizontally extending plates 25—26 terminating in an angularly offset stop member 36 (Figure 5) which bridges the horizontally extending plates 25—26 for support thereon at the upper limit of movement of a wire 37 constituting part of the slab cutter as will appear more fully hereinafter.

The slab cutter wire 37 (Figure 5) is tensioned between side rods 38 (Figure 5) which have trunnions 39 at their upper extremities to ride in slightly inclined vertical guide slots 40 provided in a cutter frame 41. The cutter side rods 38 are operatively connected at their lower extremity to a block 42 which in turn is journalled on the pintle 43 carried by the upper extremity of an elongated actuating lever 44 (Figures 2, 5 and 6). The actuating lever 44 inclines downwardly with its lower extremity having a tension spring 45 anchored thereto with the other spring end anchored as at 46 (Figure 5) to a cross channel 47 that extends underneath the longitudinal horizontal braces 13. A cam roller 48 is journalled on the actuating lever 44 proximate to the lower end thereof in confronting relation with an actuating cam 49 carried by a stub shaft 50 which is journalled in a bearing bracket 51 fixed to the longitudinal cross member 13 for support thereon.

So that the cutter guide frame 41 will oscillate to a limited degree in unison with the continuous forward movement of the horizontal column of substance on the endless conveyor 14, the frame 41 is attached as at 52 to a bracket 53 (Figure 5) that confronts a bracket 54 with an adjustable knuckle 55 therebetween. The bracket 54 terminates in a sleeve 56 (Figure 3) which is journalled on a pintle 57 carried by the furcated extremity 58 of an actuating lever 59 (Figures 5 and 6). The actuating lever 59 terminates in a bearing sleeve 60 that is disposed in alignment with another bearing sleeve 61 for pivotal support on a pintle 62 carried by a bracket 63 that is also fixed to the longitudinal frame member 13 (Figures 3 and 6). The bearing sleeve 61 is formed integral with a lever 64 as comparatively shorter than the lever 59 (Figures 3 and 5) to terminate in a furcated extremity 65 which receives a pin 66 therein. The pin 66 is carried by a vertical shaft 67 (Figure 5) which is connected to an air valve 68 (Figure 4) confined in the air cylinder 69 (Figure 5) to control the vacuum for the paper pick-up mechanism to be hereinafter described.

As shown, the cutter oscillating frame lever 59 has a cam follower roller 70 journalled thereon for reception in a cam groove 71 provided in one side 72 of a box cam 73 which is fixed on the counter-shaft 50. The other side 74 of the box cam 73 has a cam groove provided therein to receive a cam roller 75 journalled on the comparatively shorter actuating lever 64 which controls the air valve 68 within the cylinder 69. Consequently, the levers 59 and 64 are actuated by a compound box cam 73 to oscillate the cutter frame 41 while the lever 44 effects the descent of the cutter rods 38 responsive to the actuation of the cam 49 which is also fixed to the counter-shaft 50. In consequence thereof, thin slabs of plastic substance such as butter 76 (Figure 5) will be sequentially severed from the horizontal column 77 of edible substances that is extruded from the printing machine and carried by the conveyor 14 to the cutter wire 37 and its associated frame 38 and guide frame 41 which have compound movement so that the wire cutter 37 oscillates to move with the cut slab 76 and then comes down straight for the next cut.

It should be noted that the angularly offset stop member will prevent the cut slab 76 from moving in any direction other than toward a drum 78 which has nine or ten straight sides or surfaces 79 of the drum 78 and properly centered thereon as the drum 78 rotates to present the straight side 79 at the severing station denoted by the cutter frame 38, elongated transverse movable cleats 86 extend for the width of the drum 78 along the lower edges of each of the straight sides 79, to present side fingers 87 on both sides of the drum 78 for pivotal connection thereto by means of studs or pins 88. The extreme counter-clockwise movement of the cleats 86 with their fingers 87 is limited by pins 89 fixed to the end surfaces of the drum 78 in the path of the fingers 87. The movable cleats 86 serve to center the slab 76 on the straight side 79 of the drum 78 in conjunction with and relative to fixed cleats 90 attached to the upper edge of the straight sides 79 so that the latter will each have a movable lower cleat 86 and a fixed upper cleat 90 to receive the slab 76 therebetween as the drum 78 rotates in a counter-clockwise direction (viewed from Figure 5). The cleats 86—90 also serve to grasp the lower and upper edges of the butter slabs 76 as they successively are served by the oscillating and reciprocating wire cutter 37 and its frame 38 for deposit on the sides 79 of the drum 78. The cleats 86—90 thus serve to effectively retain the slabs 76 on the straight sides or surfaces 79 of the drum 78 to preclude accidental removal therefrom until released after having been ornamented and segmented or either as commercial practice may dictate.

The centering of a slab 76 is positively effected as each straight side 79 carrying a slab 76 approaches the upper horizontal position which is in vertical alignment with the cutting and impressing mechanism to be hereinafter described. This positive centering of the slabs 76 on each of the straight sides 79 is effected by the fingers 86 which are tripped against a roller 91 fixed to the side frame in the position to effect perfect registry of the slab 76 on the horizontal straight side 79 as such arrives at the superposed cutting and impressing station (Figure 5). In this position, the movable cleat fingers 87 are actuated to their extreme counter-clockwise position against the fixed pins 89 (Figure 5) to insure the positive displacement of the slabs 76 against the fixed cleat 90 in this position preparatory to being impressed and simultaneously cut into segments as will more clearly appear hereinafter (Figure 5).

This insures the proper registry in each slab 76 on the straight side 79 before the cutting and impressing means are actuated. In order to effect accurate registry of the drum 78 so that each side 79 is presented at the cutting and impressing station in absolute perfect alignment therewith, a special indexing mechanism is provided for the drum 78. The indexing mechanism comprises, in this instance, an eccentric 92 (Figure 8) mounted on the drum shaft 81 to cooperate with a correspondingly shaped bore 93 provided in a sectional crank arm 94 which is pivotally connected at one end to a pin 95 carried by a link 96. The link 96 is pivoted as at 97 to a block 98 fixed to one side of the drum 78. The other end of the crank arm 94 is provided with a furcated extremity 99 which cooperates with and engages equi-distantly and circumferentially spaced face registering drum rollers 100 that are journalled on pins 101 anchored in the end face of the drum 78 in radial alignment with each corner presented by the straight sides 79 of the drum 78.

It will be apparent, therefore, that the rotation of the drum 78 will cause the crank arm 94 to move inwardly and outwardly responsive to the eccentric 92 so as to successively engage the equally spaced face registering drum rollers 100 to insure that the upper horizontal straight drum side 79 will be momentarily held in exact registry with the cutting and impression instrumentalities as will appear more fully hereinafter.

It should be noted that the indexing crank arm 94 has a finger 102 (Figure 8) extending from the forked or furcated extremity 99 thereof to engage a drum roller engaging stop bar 103 (Figure 9) that engages over the most elevated roller 100 to retain the drum 78 momentarily inactive with the top straight drum side 79 at its most elevated precise horizontal position at the cutting and impressing station. The stop bar 103 is arcuate to successively receive the rollers 100 which is accomplished by mounting the stop bar 103 on convergent rods 104—105 having aligned sleeve bosses 106—107 journalled on a pin 108 carried by a sleeve bearing 109 fixed to the frame side plate 85 by means of a bracket 110 having fasteners 111 extending therethrough.

A spring 112 is anchored between the stop bar mount 105 and the side plate 85 to normally urge the stop bar 103 down in the path of the rollers 100. While the drum 78 is momentarily held stationary by the stop bar 103 in engagement with the topmost roller 100, an extension 113 on the stop bar 103 is disposed in the path of the finger 102 on the fork 99 as the latter is displaced in a clockwise direction (viewed from Figure 8) to remove the stop bar 103 from engagement with the roller.

This displacement of the stop bar 103 permits the crank arm 94 to rotate the drum 78 to bring the next succeeding straight drum side 79 to the topmost horizontal cutting and impressing position. In this position the stop bar 103 again momentarily engages a roller 100 by reason of the downward displacement of the stop bar 103 on the roller 100 responsive to the urge of the spring 112 on the stop bar mount 105. Because the drum 78 is journalled on the shaft 81 and the intermittent rotation thereof is effected by the eccentric 92 through the crank arm 94 which together with the stop bar 103 and the rollers 100 successively bring the straight drum sides 79 to rest at the uppermost horizontal position. At this moment the cutting and impressing instrumentalities are actuated as will be presently described.

The uppermost horizontal drum side 79 carries with it a slab 76 which is superposed thereon. A plurality of individual impressing dies 115 are fixed to a platen 116 with normally intersecting segment cutting blades 117 disposed therebetween. The normally intersecting segment cutting blades 117 are attached to a plate 118 while the dies 115 are reciprocable relative thereto with the platen 116 which is movably confined within a housing 119 that also fixedly supports the cutter mounting plates 118 (Figure 9). The platen 116 is disposed above the cutter blades 117 so that the individual dies 115 can be raised or lowered therewith relative to the intersecting blades 117 depending upon the movement of the housing 119 in a vertically downward direction. Springs 120—121 within the housing 119 normally urge the platen 116 with the dies 115 downwardly.

To this end, the housing 119 is provided with integral mounting side arms 122—123 (Figure 9) which terminate in vertical sleeves 124—125 that are attached to the upper extremities of vertical posts 126—127 by means of suitable fasteners 128—129. The posts 126—127 are vertically guided in elongated slide bearing sleeves 130—131 (Figures 5 and 9) fixed to the inner surfaces of the frame plates 85. The lower extremities of the vertical posts 126—127 are each provided with a sleeve 132 (Figure 5) to which is attached a cam follower roller 133 and a spring anchoring lug 134.

A tension spring 135 extends between the mount of the finger tripping roller 91 and the lug 134 to normally retain the cam follower roller 133 in contact with a cam 136 fixed to the drum shaft 81 to depress the housing 119 and its supporting posts 126—127 so as to bring the impression dies 115 and cutter blades 117 in operable contact with the substance slab 76 disposed on the drum side 79 at the topmost horizontal position in vertical alignment with the cutting and impression instrumentalities presently described, this being the cutting and impressing station referred to previously and at which time the drum 78 is momentarily at rest.

So that the substance slabs 76 will be laterally centered parallel to the drum axis on the drum side 79 at the cutting and impression station before the cutting and impressing is effected, the housing supporting posts 126—127 are provided with sleeves 136—137 (Figures 9 and 10) adjustably fixed thereto by means of set screws 138 to support cam actuating rollers 139—140. The cam rollers 139—140 confront trip cams 141—142 fixed to centering cleats or plungers 143—144 mounted in guides 145—146. The centering cleats or plungers 143—144 are in horizontal alignment with the slab 76 resting on the top drum side 79 at the cutting and impression station, and springs 147—148 normally urge the cleats or plungers 143—144 from each other so that the trip cams 141—142 are actuated by the rollers 139—140 against the urge of the springs 147—148.

This actuation of the slab centering cleats or plungers 143—144 takes place just before the impression dies 115 and cutter blades 117 make contact with the slab 76 at the cutting and impression station, and effectively grasp the side edges of the slabs 76 to cooperate with the lower and upper cleats 86—90 to hold the slabs 76 against removal from the drum surfaces 79 on the up-stroke of the dies 115 and cutters 117. The cutting and impressing should be effected with the dies 115 and cutters 117 at a predetermined and more or less constant temperature depending upon room temperatures and the initial temperature of the slabs 76. These controls make for perfection, speed and uniformity in the simultaneous impressing and segmenting operations. To this end, an electrical heating element 149 (Figure 9) is provided for contact with the housing 119 to conduct heat to the platen 116 and the dies 115 as well as the cutter blades 117, thereby keeping them at the desired temperature which will approximate 125° F. for butter with variable ranges for different climatic conditions and other substances. A temperature indicator 150 equipped with an adjustable thermostat is provided to automatically control the temperature to that set in any particular situation.

It should be noted that the slabs 76 are severed from the horizontal column of substance 77 (Figure 5) and displaced onto an adjacent drum side 79 by the oscillating movement of the slab cutter frame 41 after paper liners 151 (Figures 2, 4 and 5) are automatically applied to the drum sides 79 as such rotate to the slab severing and feeding station so that a liner 151 is in position thereon to receive the slab 76 thereover. The paper liners 151 are stacked in a floating magazine or rack 152 that is slidably mounted on confronting channels 153 disposed at an acute angle of substantially 15 degrees to slidably receive the rack or magazine 152 therealong (Figures 2 and 4).

The rack or magazine 152 is roller mounted to slide in the channels 153 for normal displacement upwardly along the incline thereof by reason of a tension spring 154 which is mounted as at 155 to the magazine or rack 152 while the other spring extremity 156 is anchored to the cross channel 47 of the underframe which supports the air suction cylinder 69. The urge of the spring 154 retains the stacked paper liners 151 in the path of rubber suction cups 157—158 (Figure 10) which will be presently described. In order to fill the magazine or rack 152 with paper liners, it is held in wide open or loading position by means of toggle levers 159—160 (Figure 4) that are operatively connected as at 155 to the magazine or rack 152 and to a bearing 161 comprising a part of a bracket 162 which depends from the lower frame cross member 13.

A lever 163 is operatively connected to the toggle lever 160 to enable the displacement of the magazine 152 to its extreme lowermost position on the channels 153 and there it is locked in wide open position by the toggle levers 159—160 against the urge of the spring 154. After the magazine 152 is loaded with a stacked supply of paper liners 151, the lever 163 is shifted to its extreme clockwise position to enable the spring 154 to cause the magazine or rack 152 to slide upwardly along the channels 153 to compensate for paper consumption.

In order to individually feed the paper liners 151 along a predetermined path for application to the drum side 79 as the drum 78 intermittently rotates in a counter-clockwise direction (viewed from Figure 5), the rubber suction cups 157—158 are mounted on ears 164 fixed to crank arm 165—166 which terminate in hubs 167—168 (Figures 5 and 10) that are fixed to a hollow shaft 169 journalled in bearings 170—171 attached to vertical frame members 172—173. The rubber suction cups 157—158 are provided with rigid tubes 174 that extend through the ears 164 of the crank arms 165—166 for communication through flexible tubes 175 that extend into and communicate with ports 176 that communicate with the interior of the shaft 169. The shaft 169 is provided with an air commutator assembly 177 so that air suction is transferred to the rotating shaft 169 by means of a tube 178 (Figures 3 and 4). The tube 178 communicates with the air suction cylinder 69 constituting a vacuum pump timed so that the vacuum created is transmitted to the rubber suction cups 157—158 as such rotate in a clockwise direction (viewed from Figure 4) and come in contact with the paper liners 151.

The paper liners 151 are individually transferred by the rubber suction cups 157—158 to a curved wire grid 179 (Figures 5 and 10) connected by individual bosses 180 to a horizontal rod 181 that is supported by spaced ears 182 (Figure 5) depending from the side frame plates 85 (Figure 2). A confronting and correspondingly curved wire grid 183 (Figure 5) mounted to extend in spaced confronting relation from the mid-portion of the grid 179 (Figure 5) to assume the general curved contour of the path of travel of the drum 78 up to and substantially in line with the horizontal surface of the endless conveyor 14 so that the individual paper liners 151 will be released by the rubber suction cups 157—158 at a point of engagement thereof by the movable cleats 86 along the receding edges of the drum side 79.

To this end, the movable cleats 86 are provided with a series of notches 184 (Figure 9) that are spaced to correspond with the spacing of the wires of the grid 183 so as to project therebetween as the drum 78 rotates the lowermost movable cleats 86 in the path of the grid 183 to move the paper liners 151 upwardly therealong in a position confronting each of the drum sides 79 so that the severed slabs 76 are displaced thereon with the paper liner 151 thereunder. To insure the individual feeding of the paper liners 151, holding pins (not shown) are provided in conjunction with the paper feeding mechanism 166 so that the individual paper liner 151 adjacent the suction cups 157—158 will be slightly torn by the pins as such proceed therewith so that the next adjacent stack sheet cannot adhere thereto, this being an expedient that is well known in the paper feeding art.

The paper liner 151 is appreciably wider than the drum sides 79 and the slab 76 disposed thereon so as to enable folding thereover at the discharge station after the slabs 76 have been segmented and impressed. The paper liners 151 are folded over the impressed and segmented surface of the slab 76 as the drum 78 with the processed slab thereon intermittently rotates to a position substantially opposite the slab severing and displacement station. To accomplish the folding of the paper liners 151 over the impressed and segmented surface of the slab 76, a pivotal and slidable folder and hold-down plate 185 (Figures 1 and 9) is provided to slide transversely of and along the drum side 79 (Figures 8 and 9) at the discharge station which is substantially opposite the feeding station. To this end, the folder and hold-down plate 185 is provided with hinge sleeves 186 that are complemental to hinge sleeves 187 provided on a confronting delivery plate 188 (Figure 1).

A coil spring 189 is mounted in a bracket 190 that is hinged as at 191 to normally cause the folder plate 185 to assume a position adjacent to and in contact with the delivery plate 188. With this arrangement, the folder plate 185 is spring actuated to fold the paper liner over the exposed surface of the segmented and impressed slab 76 at the initial point of displacement of the slab 76 from the drum side 79 at the discharge station. It should be noted that the folder plate 185 has a plurality of extended vertically spaced fingers 192, in this instance four, which receive pins 193 therebetween which extend from the delivery plate 188 so as to serve as a shoulder or stop against which the segmented and impressed slab 76 abuts for delivery of the slidable displacement of the folding and delivery plates 185—188 transversely along the drum side 79 from left to right as viewed in Figure 9.

This motion is effected by means of a sleeve mount 194 to which the delivery plate 188 is rigidly attached for guidance along a transverse rod 195 which extends between the frame members 10. A pivotal bearing 196 extends from the point of attachment between the delivery plate 188 and the guide sleeve 194 (Figure 8) to provide an elongated rod 197 in telescopic association with a sleeve 198 that has a plate 199 extending therefrom for pivotal connection through a joint 200 to a bracket 201 fixed to a plate 202 that is anchored to a cross member 203 of the frame 10 (Figure 9). The plate 199 extends downwardly beyond the pivotal joint 200 to carry a cam follower roller 204 that rides in a cam groove 205 provided in the cylindrical cam 206 which is fixed to a countershaft 207 extending between and journalled in the vertical frame members 208. With this mechanism, the sleeve 194 carries the confronting folding and delivery plates 185—188 to the extreme left where contact is established between the spring hinge member 190 and a fixed cam 209 mounted on the side plate 85 (Figure 9) to open the folding plate 185 relative to the delivery plate 188 so that that portion of the paper liner 151 projecting beyond the slab 79 will be engaged therewith and as the movement proceeds to the right along the drum side 79 at the discharge station, the hinge 190 rides off of the cam 209 and the spring 189 flips the folder plate 185 against the delivery plate 188 at which time the projecting portion of the paper liner 151 folded over the exposed surface of the segmented and impressed slabs 76.

This sliding movement that effects delivery of the segmented and impressed slabs 76 to the right for complete removal from the drum side 79 at the discharge station, effects delivery thereof to a perforated ejector plate 210 (Figure 9). As the segmented and impressed slab is displaced toward the ejector plate 210, a fixed hinged folding anvil or cleat 211 (Figure 1) is provided in the path thereof just prior to the slab reaching the ejector plate 210 (Figure 9).

The fixed folding anvil or cleat 211 prevents the segmented and impressed slab 76 from coming back after it reaches the ejector plate 210, and also serves to fold the oppositely projecting portion of the paper liner 151 over the other half of the exposed portion of the segmented and impressed slab 76 to cause the flap to adhere thereto. This completes the wrapping of the segmented and impressed slab 76 with the paper liner 151 as delivery is effected to the ejector plate 210 that has a shoulder 212 at its extreme edge to preclude the wrapped slab from being displaced beyond the ejector plate 210 that has its lower edge in alignment with the table top 213 (Figures 1 and 2) extending from the discharge station to the extremity of the frame so as to support the wrapped slab 76 on end adjacent the ejector plate 210. The ejector plate 210 (Figure 2) is fixed in a slightly inclined position to a lever 214 which is bent to provide a depending offset 215 that is pivoted as at 216 to a bracket 217 fixed to the vertical frame member 208.

The lever offset 215 extends beyond the pivot 216 to provide a cam follower roller 218 at the lower extremity thereof to ride in confronting relation with a cam 219 (Figure 9) fixed to the counter-shaft 207 to actuate the ejector plate 210 in a counterclockwise direction (viewed from Figure 2) at the terminus of the cycle to discharge the wrapped segmented and impressed slab 76 onto an endless conveyor 220 mounted on rollers 221—222 journalled in the frame 10 to present a surface in alignment with the table top 213 for discharge of the wrapped and segmented slabs 76 onto a chute 223 where they can be packed into cartons according to the dictates of commercial practice.

A spring 224 extends between the ejector lever 214 and the frame 10 (Figure 2) to maintain contact between the cam follower roller 218 and the cam 219. This cycle of steps is continuously and automatically proceeded with so long as the horizontal column of substance 77 is provided on the endless conveyor 14. Should it be desired to provide a tempering fluid such as water within the platen 116 (Figure 9) and thus procure a more uniform temperature with more effective control, flexible pipes 225—226 may be provided for communication with the platen 116, and these extend to a water tank supply 227 (Figure 2) mounted on corner posts 228 that are supported by bearing brackets 229 which, in turn, support the bearings 82—83 for the drum shaft 81. To this end, the corner posts 228 have a flanged plate 230 provided thereon to receive the water tempering tank 227 thereon.

The instrumentalities described supra are power actuated from a single electric motor 231 (Figure 2) posted on brackets 232—233 supported by the lower cross members 13 of the frame 10. The motor 231 has a pulley 234 on the armature shaft thereof to drive a belt 235 that engages another pulley 236 fixed to a driven stub shaft 237 (Figure 3) which operates a clutch 238 that is controlled by a rod 239 having connection with a manual lever 240 (Figure 2) pivoted as at 241 to the frame 10. The lever 240 extends upwardly beyond the table top 213 to present a manual gripping handle 242 so that the operation of the instrumentalities can be controlled even though the motor 231 is in operation.

The driven end of the clutch 238 (Figure 3) terminates in a shaft 243 that operates a speed reducer 244 that has a driven shaft 245 extending therethrough to drive sprockets 246 and 247. The sprocket 246 has a chain 248 which extends to a sprocket 249 fixed to the drum shaft 81 to operate the eccentric 92 and the crank arm 94 which imparts intermittent rotation to the drum 79. The shaft 81 also operates the cams 136 which actuate the cutting and impressing instrumentalities 115—117 as described supra. Another sprocket 250 is provided on the shaft 245 (Figure 1) to operate a sprocket 251 fixed on the counter-shaft 207 to operate the cams 206—219 (Figure 9) which in turn actuate the slab delivery slide and paper liner folder in conjunction with the ejector plate 210.

The sprocket 247 has a chain drive 252 which idles over a sprocket 253 (Figure 2) that is supported by the lower frame cross member 13 to extend to a sprocket 254 constituting a driver for an adjustable speed selector 255 (Figure 3) supported by a base plate 256' that extends between the lower frame member 13 (Figures 2 and 7). The speed selector 255 (Figure 7) is of standard construction and governs the speed of the endless feed conveyor 14 through a chain 256 so that the thickness of the slab 76 can be varied within a wide range, this mechanism providing both fine and rough adjustment for a maximum variation in weights of the slab 76 as they are to be processed in accordance with the teachings of the invention.

Another chain 257 extends to another speed selector sprocket 258 to mesh with an idler sprocket 259 fixed to the vertical frame member 12 (Figure 2) so as to run over a portion of a sprocket 260 that is fixed to a shaft 169 to rotate the rubber suction cups 157 comprising part of the feeder for the paper liners 151 (Figure 5). The counter-shaft 50 is operated through a belt 261 which is driven by a pulley 262 operated through a train of gears within the speed selector 255, and this drives a pulley 263 fixed to the counter-shaft 50 for operating the various instrumentalities connected thereto as previously described. The endless discharge conveyor 213 is driven from the endless feeding conveyor 14 through a chain 264 (Figure 2) so that the feeding and discharge will be in corresponding linear travel speeds.

It will be apparent, therefore, that all of the instrumentalities are interconnected for operation in timed relation to perform the functions described in connection with each of the instrumentalities that process the edible substances from a large horizontal column 77 (Figure 5) into segmented and impressed slabs 76 which are each provided with a paper wrapper 151, and these instrumentalities are all responsive to a single source of power which, in the present embodiment, constitutes the electric motor 231. With the arrangement of parts above described, a much more competent machine operating at much higher speeds with increased production has been provided to constitute a substantial improvement over the co-pending application, Serial No. 450,769 filed July 13, 1942, toward which all of the present applicants contributed.

While we have illustrated and described a preferred embodiment of this invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. In a device of the character described for cutting and impressing articles, the combination with means for feeding the articles along a predetermined path, of a multi-straight sided drum for receiving the articles successively thereon, cutting and impressing means fixedly mounted to confront the successive straight sides of said drum in the latter's path of rotary movement, means for intermittently rotating said drum to present the articles under said cutting and impressing means, means for displacing said cutting and impressing means relative to said drum while the latter is at rest in confronting relation therewith, means for indexing said drum to successively locate the articles between said drum surfaces and said cutting and impressing means, and means for discharging the impressed articles from the predetermined path.

2. In a device of the character described, the combination with an endless circumferential series of straight drum sides defining conveying means for feeding articles along a predetermined path, of combined impressing and segmenting means fixedly mounted to confront said straight drum sides at a predetermined station in the path thereof, means for intermittently rotating said drum sides relative to said impressing and segmenting means, means for depositing sliced slabs of substances on successive straight drum sides during successive periods of dwell thereof, means for reciprocating said impressing and cutting means while momentarily in confronting relation with successive straight drum sides during the intermittent dwell thereof, means for transversely displacing the impressed and segmented article from said path to a position beyond said straight drum sides, and ejecting means for stacking said impressed and segmented articles.

3. In a device of the character described, the combination with an endless circumferential series of straight drum sides defining conveying means for feeding articles along a predetermined path, of combined impressing and segmenting means mounted to confront said straight drum sides at a predetermined station in the path thereof, means for intermittently rotating said drum sides relative to said impressing and segmenting means, means for depositing paper liners on successive straight drum sides during the dwell in the rotation thereof, means for depositing sliced slabs of substances on successive straight drum sides during successive periods of dwell thereof, means for reciprocating said impressing and cutting means while momentarily in confronting relation with successive straight drum sides during the intermittent dwell thereof, means for transversely displacing the impressed and segmented article from said path to a position beyond said straight drum sides, and ejecting means for stacking said impressed and segmented articles.

4. In a device of the character described, the combination with an endless circumferential series of straight drum sides defining conveying means for feeding articles along a predetermined path, of combined impressing and segmenting means mounted to confront said straight drum sides at a predetermined station in the path thereof, means for intermittently rotating said drum sides relative to said impressing and segmenting means, means for depositing paper liners on successive straight drum sides during the dwell in the rotation thereof, means for depositing sliced slabs of substances on successive straight drum sides during successive periods of dwell thereof, means for reciprocating said impressing and cutting means while momentarily in confronting relation with successive straight drum sides during the intermittent dwell thereof, means for transversely displacing the impressed and segmented article from said path to a position beyond said straight drum sides, said last named displacing means including a folder for said paper liner for covered application to said impressed and segmented article, and ejecting means for stacking said impressed and segmented articles.

5. In a device of the character described, the combination with an endless circumferential series of straight drum sides defining conveying means for feeding articles along a predetermined path, of combined impressing and segmenting means mounted to confront said straight drum sides at a predetermined station in the path thereof, means for intermittently rotating said drum sides relative to said impressing and segmenting means, means for depositing paper liners on successive straight drum sides during the dwell in the rotation thereof, means for depositing sliced slabs of substances on successive straight drum sides during successive periods of dwell thereof, means for reciprocating said impressing and cutting means while momentarily in confronting relation with successive straight drum sides during the intermittent dwell thereof, means for transversely displacing the impressed and segmented article from said path to a position beyond said straight drum sides, said last named displacing means including a folder for said paper liner for covered application to said impressed and segmented article, stationary means in the path of the transverse displacement of the impressed and segmented article to fold the opposite end of said paper liner in enveloping relation with said article, and ejecting means for stacking said wrapped impressed and segmented articles.

6. In a device of the character described, the combination with an endless circumferential series of straight drum sides defining conveying means for feeding articles along a predetermined path, of combined impressing and segmenting means mounted to confront said straight drum sides at a predetermined station in the path thereof, means for intermittently rotating said drum sides relative to said impressing and segmenting means, means for depositing paper liners on successive straight drum sides during the dwell in the rotation thereof, means for feeding a solid column of substance toward said straight drum sides, means for simultaneously slicing slabs of substances from said substance column and depositing said sliced slabs of substances on successive straight drum sides during successive periods of dwell thereof, means for reciprocating said impressing and cutting means while momentarily in confronting relation with successive straight drum sides during the intermittent dwell thereof, means for transversely displacing the impressed and segmented article from said path to a position beyond said straight drum sides, said last named displacing means including a folder for said paper liner for covered application to said impressed and segmented article, stationary means in the path of the transverse displacement of the impressed and segmented article to fold the opposite end of said paper liner in enveloping relation with said article, and ejecting means for stacking said wrapped impressed and segmented articles.

7. In a device of the character described, the combination with an endless circumferential series of straight drum sides defining conveying means for feeding articles along a predetermined path, of combined impressing and segmenting means mounted to confront said straight drum sides at a predetermined station in the path thereof, means for intermittently rotating said drum sides relative to said impressing and segmenting means, means for feeding a solid column of substance toward said straight drum sides, means for simultaneously slicing slabs of substances from said substance column and depositing said sliced slabs of substances on successive straight drum sides during successive periods of dwell thereof, means for reciprocating said impressing and cutting means while momentarily in confronting relation with successive straight drum sides during the intermittent dwell thereof, means for transversely displacing the impressed and segmented article from said path to a position beyond said straight drum sides, and ejecting means for stacking said impressed and segmented articles.

8. In a device of the character described for cutting and impressing articles, the combination with means for feeding the articles along a predetermined path, of a multi-straight sided drum for receiving the articles successively thereon, cutting and impressing means mounted to confront the successive straight sides of said drum, means for intermittently rotating said drum to present the articles under said cutting and impressing means, means for feeding a solid column of substance toward said straight drum sides, means for successively slicing slabs of substances from said substance column for deposit on successive straight drum sides in timed relation with the rotation of said drum, means for displacing said cutting and impressing means relative to said drum while the latter is at rest in confronting relation therewith with a sliced slab of substance therebetween, means for indexing said drum to successively locate the articles between said drum surfaces and said cutting and impressing means, and means for discharging the impressed articles from the predetermined path.

9. In a device of the character described for cutting and impressing articles, the combination with an endless circumferential series of independently acting straight sides on a drum defining conveying means for feeding the articles along a predetermined path, of impressing means mounted to confront the straight sides of said conveying means, means for intermittently rotating said drum sides relative to said impressing means, means for depositing paper liners on successive straight drum sides during the dwell in the rotation thereof, means for feeding a solid column of substance toward said straight drum sides, means for successively slicing slabs of substances from said substance column for deposit on successive straight drum sides in timed relation with the rotation of said drum, and means for displacing said impressing means relative to said drum while the latter is at rest in confronting relation therewith with a sliced slab therebetween.

10. In a device of the character described for cutting and impressing articles, the combination with an endless circumferential series of independently acting straight sides on a drum defining conveying means for feeding the articles along a predetermined path, of impressing means mounted to confront the straight sides of said conveying means, means for intermittently rotating said drum sides relative to said impressing means, means for depositing paper liners on successive straight drum sides during the dwell in the rotation thereof, means for feeding a solid column of substance toward said straight drum sides, means for successively slicing slabs of substances from said substance column for deposit on successive straight drum sides in timed relation with the rotation of said drum, means for centering said substance slabs on the straight sides of said drum, and means for displacing said impressing means relative to said drum while the latter is at rest in confronting relation therewith with a sliced slab therebetween.

11. In a device of the character described for cutting and impressing articles, the combination with rotary means for feeding the articles along a predetermined path, of impressing means mounted to confront said rotary feeding means, means for intermittently rotating said rotary feeding means, said last named intermittent rotating means including an eccentric, a crank arm for operation responsive to said eccentric, means on the side of said rotary feeding means to cooperate with said crank arm for rotating and indexing said drum in confronting relation with said impressing means, and means for displacing said impressing means relative to the said rotary feeding means while the latter is momentarily at rest to act on the articles disposed on said rotary feeding means.

12. In a device of the character described for cutting and impressing articles, the combination with rotary means for feeding the articles along a predetermined path, of impressing means mounted to confront said rotary feeding means, means for intermittently rotating said rotary feeding means, said last named intermittent rotating means including an eccentric, a crank arm for operation responsive to said eccentric, means on the side of said rotary feeding means to cooperate with said crank arm for rotating and indexing said drum in confronting relation with said impressing means, means for depositing sliced slabs on successive drum sides provided on said rotary feeding means during the dwell in the rotation thereof, means for centering said substance slabs on the straight sides of said drum, and means for displacing said impressing means relative to the said rotary feeding means while the latter is momentarily at rest to act on said sliced slabs disposed on said successive drum sides of said rotary feeding means.

13. In a device for impressing and cutting preformed masses of edible plastic substances into ornamented segments, the combination with a continuously moving conveyor for supporting and continuously moving a preformed large print of edible plastic substances along a predetermined path, of cutting means in said path to confront said continuously moving conveyor, means for continuously operating said cutting means in timed relation to said continuously moving conveyor to sever uniform slabs from said large print of edible plastic substances, and other conveyor means for successively receiving said cut slabs in timed relation with the severance thereof from said substance print for intermittently moving each substance slab to a predetermined position, and means for impressing and segmenting each substance slab into a plurality of ornamented segments while the slabs are intermittently at rest.

14. In a device for impressing and cutting preformed masses of edible plastic substances into ornamented segments, the combination with a continuously moving conveyor for supporting and continuously moving a preformed large print of edible plastic substances along a predetermined path, of cutting means in said path to confront said continuously moving conveyor, means for continuously operating said cutting means in timed relation to said continuously moving conveyor to sever uniform slabs from said large print of edible plastic substances, and other conveyor means for successively receiving said cut slabs in timed relation with the severance thereof from said substance print for intermittently moving each substance slab to a predetermined position, means for impressing and segmenting each substance slab into a plurality of ornamented segments while the slabs are intermittently at rest, and means for removing the compressed and segmented slabs from said predetermined path of travel.

15. In a device for impressing and cutting preformed masses of edible plastic substances into ornamented segments, the combination with a continuously moving conveyor for supporting and continuously moving a preformed large print of edible plastic substances along a predetermined path, of cutting means in said path to confront said continuously moving conveyor, means for continuously operating said cutting means in timed relation to said continuously moving conveyor to sever uniform slabs from said large print of edible plastic substances, said continuously operating cutting means including instrumentalities for imparting to and fro movement thereto in different planes, and other conveyor means for successively receiving said cut slabs in timed relation with the severance thereof from said substance print for intermittently moving each substance slab to a predetermined position, and means for impressing and segmenting each substance slab into a plurality of ornamented segments while the slabs are intermittently at rest.

16. In a device for impressing and cutting preformed masses of edible plastic substances into ornamented segments, the combination with a continuously moving conveyor for supporting and continuously moving a preformed large print of edible plastic substances along a predetermined path, of cutting means in said path to confront said continuously moving conveyor, means for imparting continuous combined oscillatable and reciprocable movement to said cutting means in timed relation to said continuously moving conveyor to sever uniform slabs from said large print of edible plastic substances, and other conveyor means for successively receiving said cut slabs in timed relation with the severance thereof from said substance print for intermittently moving each substance slab to a predetermined position, and means for impressing and segmenting each substance slab into a plurality of ornamented segments while the slabs are intermittently at rest.

17. In a device of the character described including means for preforming edible plastic substances into a horizontal substance column, the combination with a continuously moving endless conveyor for displacing the horizontal substance column along a straight path, of a cutter frame pivotally mounted in said path, cutting means reciprocally mounted in said pivotally mounted frame to sever successive slabs from said horizontal substance column, means for reciprocating said cutting means in said frame, means for oscillating said frame during the reciprocation of said cutting means therein to synchronize the movement of said cutting means with the forward displacement of said horizontal substance column for severing uniform slabs from said continuously moving horizontal substance column, means for presenting each slab on a paper liner to a forward position, and means at the forward position to impress and cut said slabs into a plurality of impressed segments.

18. In a device of the character described including means for preforming edible plastic substances into a horizontal substance column, the combination with a continuously moving endless conveyor for displacing the horizontal substance column along a straight path, of a cutter frame pivotally mounted in said path, cutting means reciprocally mounted in said pivotally mounted frame to sever successive slabs from said horizontal substance column, means for reciprocating said cutting means in said frame, means for oscillating said frame during the reciprocation of said cutting means therein to synchronize the movement of said cutting means with the forward displacement of said horizontal substance column for severing uniform slabs from said continuously moving horizontal substance column, means for presenting each slab on a paper liner to a forward position, means for retaining said slabs stationary at the forward position, and means at the forward position to simultaneously impress and cut said slabs into a plurality of impressed substance.

19. In a device of the character described including means for preforming edible plastic substances into a horizontal substance column, the combination with a continuously moving endless conveyor for displacing the horizontal substance column along a straight path, of a cutter frame pivotally mounted in said path, cutting means reciprocally mounted in said pivotally mounted frame to sever successive slabs from said horizontal substance column, means for reciprocating said cutting means in said frame, means for oscillating said frame during the reciprocation of said cutting means therein to synchronize the movement of said cutting means with the forward displacement of said horizontal substance column for severing uniform slabs from said continuously moving horizontal substance column, means for presenting each slab on a paper liner to a forward position, means for retaining said slabs stationary at the forward position, means at the forward position to simultaneously impress and cut said slabs into a plurality of impressed segments, and means for folding said paper liner around the impressed and segmented patties of each slab.

CHARLES DOERING.
HENRY H. DOERING.
BERTIL J. SKOGLUND.

References Cited in the file of this patent

UNITED STATES PATENTS

| Number | Name | Date |
|---|---|---|
| 1,110,112 | Cross | Sept. 8, 1914 |
| 1,661,086 | Popov | Feb. 28, 1928 |
| 1,938,969 | McKinnon | Dec. 12, 1933 |
| 1,960,486 | Freeman | May 29, 1934 |
| 2,010,524 | McClatchie | Aug. 6, 1935 |
| 2,201,872 | Rottenberg | May 21, 1940 |
| 2,441,757 | Doering et al. | May 18, 1948 |

FOREIGN PATENTS

| Number | Country | Date |
|---|---|---|
| 408,852 | Great Britain | Apr. 19, 1934 |